United States Patent
Itoh

(10) Patent No.: US 10,029,173 B2
(45) Date of Patent: Jul. 24, 2018

(54) TRAINING SYSTEM AND TRAINING METHOD

(71) Applicant: TOYOTA JIDOSHA KABUSHIKI KAISHA, Toyota-shi, Aichi-ken (JP)

(72) Inventor: Masayuki Itoh, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 784 days.

(21) Appl. No.: 14/549,978

(22) Filed: Nov. 21, 2014

(65) Prior Publication Data

US 2015/0151200 A1    Jun. 4, 2015

(30) Foreign Application Priority Data

Dec. 2, 2013 (JP) ................. 2013-249357

(51) Int. Cl.
*A63F 13/213*    (2014.01)
*A63F 13/40*    (2014.01)
(Continued)

(52) U.S. Cl.
CPC ............ *A63F 13/213* (2014.09); *A63F 13/10* (2013.01); *A63F 13/12* (2013.01); *A63F 13/67* (2014.09); *B60W 10/20* (2013.01); *B60W 30/08* (2013.01); *B60W 30/09* (2013.01); *G08G 1/16* (2013.01); *G08G 1/165* (2013.01); *G08G 1/166* (2013.01); *G08G 1/167* (2013.01)

(58) Field of Classification Search
CPC .......... G08G 1/166; G08G 1/165; G08G 1/16; G08G 1/167; B60W 30/09; B60W 10/20; B60W 30/08; A63F 13/213; A63F 13/10; A63F 13/12; A63F 13/67
See application file for complete search history.

(56) References Cited

U.S. PATENT DOCUMENTS

| 8,169,342 B1 * | 5/2012 | Barbeau ................. G01C 21/20 340/539.11 |
| 2005/0234610 A1 | 10/2005 | Shimizu et al. |

(Continued)

FOREIGN PATENT DOCUMENTS

| EP | 2 444 274 A2 | 4/2012 |
| JP | S57-160459 A | 10/1982 |

(Continued)

OTHER PUBLICATIONS

Partial Translation of Sep. 1, 2015 Office Action issued in Japanese Patent Application No. 2013-249357.

*Primary Examiner* — Jack Yip
(74) *Attorney, Agent, or Firm* — Oliff PLC

(57) ABSTRACT

A training system is equipped with a first detection unit that detects a motion of a mobile body that moves within a predetermined region, and a command unit that issues a motion command for the mobile body based on the motion of the mobile body. A user operates the mobile body in accordance with the motion command of the command unit. An accessible region and an inaccessible region are set in the predetermined region. Besides, the training system is equipped with a second detection unit that detects a distance between the mobile body and the inaccessible region, and a warning unit that issues a warning when the distance detected by the second detection unit is equal to or shorter than a first predetermined value.

8 Claims, 5 Drawing Sheets

(51) Int. Cl.
  *A63F 13/30* (2014.01)
  *A63F 13/67* (2014.01)
  *G08G 1/16* (2006.01)
  *B60W 10/20* (2006.01)
  *B60W 30/08* (2012.01)
  *B60W 30/09* (2012.01)

(56) References Cited

U.S. PATENT DOCUMENTS

| | | | | |
|---|---|---|---|---|
| 2009/0109049 | A1* | 4/2009 | Frederick | F16P 3/14 340/686.6 |
| 2012/0191343 | A1* | 7/2012 | Haleem | G01C 21/3697 701/431 |
| 2012/0258804 | A1 | 10/2012 | Ahmed | |
| 2013/0005467 | A1 | 1/2013 | Kim | |
| 2013/0100287 | A1* | 4/2013 | Chien | G08G 1/167 348/148 |
| 2013/0214939 | A1* | 8/2013 | Washlow | G01S 7/003 340/901 |
| 2015/0284010 | A1* | 10/2015 | Beardsley | B60W 50/10 701/41 |

FOREIGN PATENT DOCUMENTS

| | | | |
|---|---|---|---|
| JP | 2003-135851 | A | 5/2003 |
| JP | 2009-134488 | A | 6/2009 |
| JP | 2011-131620 | A | 7/2011 |
| JP | 2012-203677 | A | 10/2012 |
| JP | 2013-539377 | A | 10/2013 |
| JP | 5338726 | B2 * | 11/2013 |

\* cited by examiner

TRAINING SYSTEM AND TRAINING METHOD

INCORPORATION BY REFERENCE

The disclosure of Japanese Patent Application No. 2013-249357 filed on Dec. 2, 2013 including the specification, drawings and abstract is incorporated herein by reference in its entirety.

BACKGROUND OF THE INVENTION

1. Field of the Invention

The invention relates to a training system and a training method for training a user that operates a mobile body within a predetermined region.

2. Description of Related Art

There is known an art for detecting a motion of a user through the use of a camera or the like, and controlling a game based on the detected motion of the user (see Japanese Patent Application Publication No. 2003-135851 (JP-2003-135851 A)).

SUMMARY OF THE INVENTION

There is assumed a training system that provides a training in operating a mobile body, for example, by detecting a motion of the mobile body and performing control based on the detected motion of the mobile body, through the use of the aforementioned art. By the way, it is difficult to allege that the training with the aid of the aforementioned art is carried out in sufficient consideration of an accessible region that can be entered by the mobile body and an inaccessible region that cannot be entered by the mobile body. For example, the mobile body may enter the inaccessible region during the training, and may come into contact with an obstacle or the like. In this circumstance, the training system according to the related art may require an assistant or the like who provides assistance in the training. The invention has been made to solve this problem, and provides a training system and a training method that can realize high levels of safety and labor-saving.

One aspect of the invention for achieving the aforementioned object is a training system in which a mobile body is operated by a user in accordance with a motion command of a command unit. This training system is equipped with: a first detection unit that detects a motion of the mobile body that moves within a predetermined region, the predetermined region including an accessible region that can be entered by the mobile body and an inaccessible region that cannot be entered by the mobile body; the command unit that issues a motion command to the mobile body based on the motion of the mobile body detected by the first detection unit; a second detection unit that detects a distance between the mobile body and the inaccessible region; and a warning unit that issues a warning when the distance detected by the second detection unit is equal to or shorter than a first predetermined value. In this aspect of the invention, the training system may be further equipped with a third detection unit that detects a distance between the mobile body on one side and the mobile body on the other side, move within the predetermined region, and the warning unit may issue a warning when the distance detected by the third detection unit is equal to or shorter than a second predetermined value. In this aspect of the invention, the warning unit may issue a motion command to guide the mobile body away from the inaccessible region when the distance detected by the second detection unit is equal to or shorter than the first predetermined value. In this aspect of the invention, the mobile body may perform inversion control in such a manner that the mobile body moves in accordance with an incline of a main body of the mobile body while maintaining an inverted state of the main body of the mobile body, and the command unit may issue the motion command such that the main body of the mobile body is inclined away from the inaccessible region. In this aspect of the invention, the warning unit may issue a warning when the distance to the mobile body detected by the second detection unit is equal to or shorter than the first predetermined value, and the warning unit may issue an exit command to the mobile body, the exit command causing the user of the mobile body to get off. In this aspect of the invention, the command unit may calculate a training proficiency level of the user aboard the mobile body, based on the motion of the mobile body detected by the first detection unit, and the command unit may adjust a training difficulty level of a training menu in accordance with the calculated training proficiency level. Another aspect of the invention for achieving the aforementioned object is a training method in which a mobile body is operated by a user in accordance with a motion command. This training method includes detecting a motion of the mobile body that moves within a predetermined region, the predetermined region including an accessible region that can be entered by the mobile body and an inaccessible region that cannot be entered by the mobile body; issuing a motion command for the mobile body based on the detected motion of the mobile body; detecting a distance between the mobile body and the inaccessible region; and issuing a warning when the detected distance is equal to or shorter than a first predetermined value.

The invention makes it possible to provide a training system and a training method that can realize high levels of safety and labor-saving.

BRIEF DESCRIPTION OF THE DRAWINGS

Features, advantages, and technical and industrial significance of one exemplary embodiment of the invention will be described below with reference to the accompanying drawings, in which like numerals denote like elements, and wherein.

DETAILED DESCRIPTION OF EMBODIMENT

Figure 1:
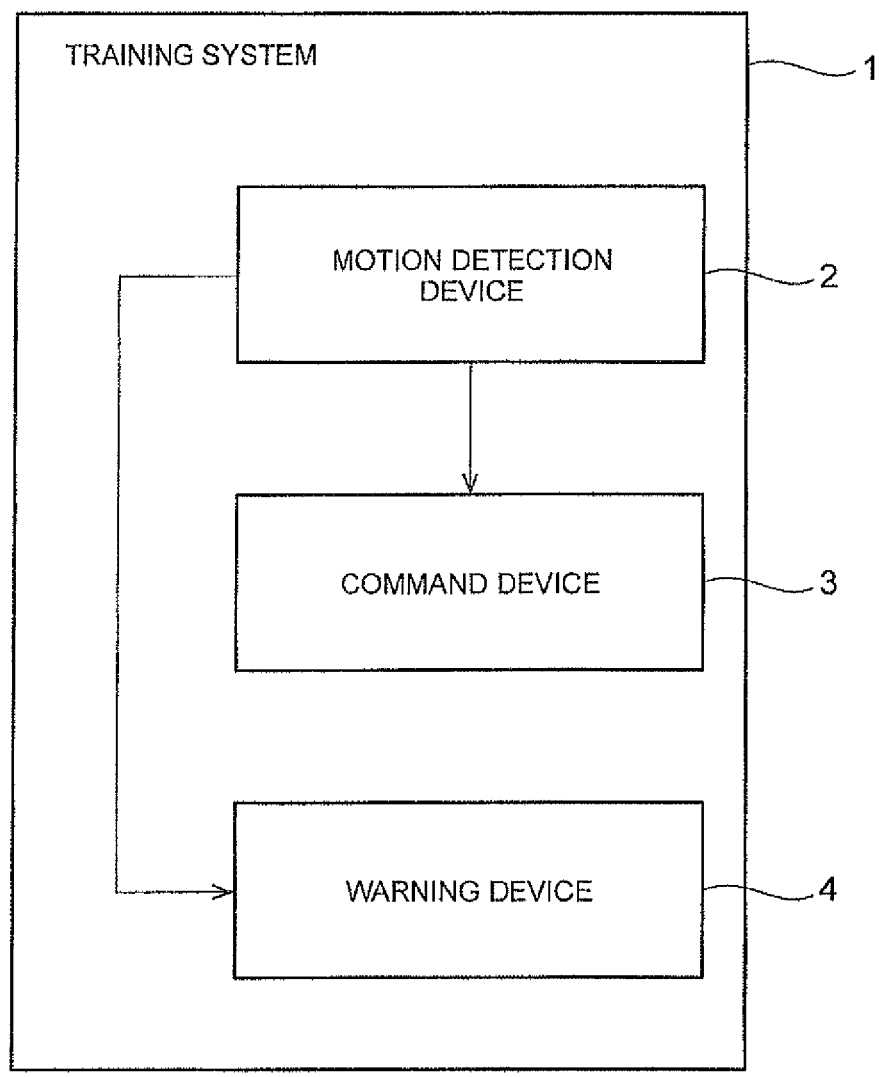
FIG. 1 is a block diagram showing an overall configuration of a training system according to the embodiment of the invention.
Figure 2:
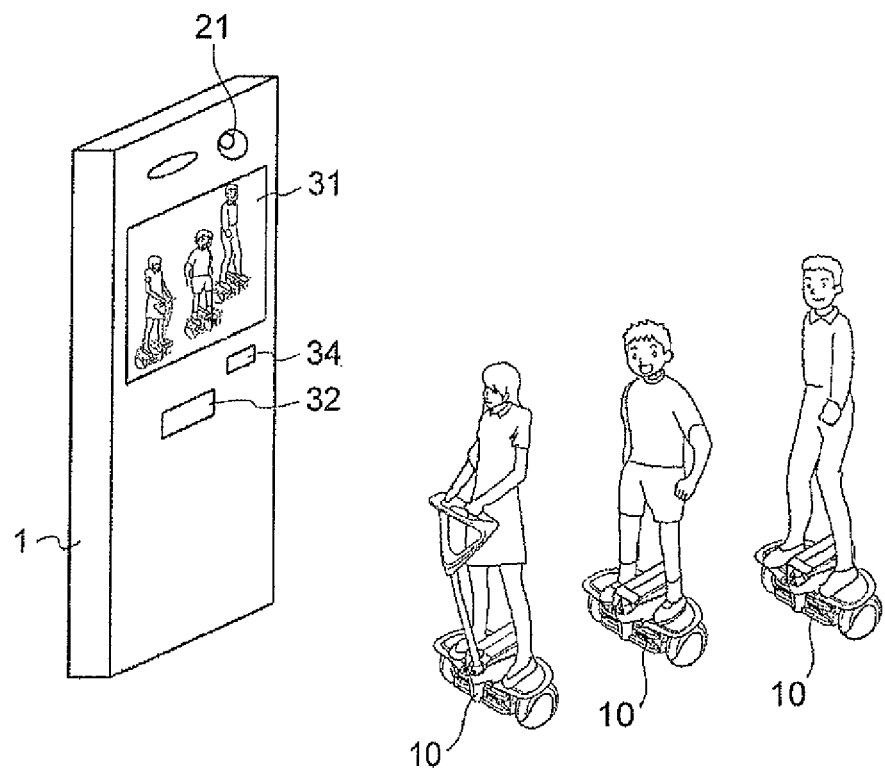
FIG. 2 is a view showing mobile bodies that are trained by the training system according to the embodiment of the invention.

The embodiment of the invention will be described hereinafter with reference to the drawings. In the training system according to the embodiment of the invention, for example, a user aboard a mobile body operates the mobile body in accordance with a motion command from the training system. In this manner, the user is trained in operating the mobile body. As the mobile body, there is applied, for example, an inverted two-wheel vehicle that can travel forward and backward, turn right and left, accelerate and decelerate etc. in accordance with the shift of the center of gravity of a passenger while maintaining an inverted state. The mobile body performs inversion control in such a manner that the mobile body moves in accordance with the incline of a main body of the mobile body while maintaining an inverted state of the main body of the mobile body. FIG. 1 is a block diagram showing an overall system configuration of the training system according to the present embodiment of the invention. FIG. 2 is a view showing mobile bodies that are trained by the training system according to the present embodiment of the invention.

The training system 1 according to the present embodiment of the invention is equipped with a motion detection device 2 that detects motions of a plurality of mobile bodies 10 that are trained in a predetermined region, or a motion of a single mobile body 10 that is trained in the predetermined region, a command device 3 that issues the motion commands for the mobile bodies 10 to users, and a warning device 4 that issues a warning to the users.

The motion detection device 2 is a concrete example of the first detection unit and the second detection unit, and can detect motions of the mobile bodies 10 within the predetermined region. For example, the motion detection device 2 is constituted by a camera, a radar sensor, an ultrasonic sensor or the like. The motion detection device 2 can detect pieces of motion information such as positions, moving directions, moving speeds, moving accelerations and the like of the mobile bodies 10 based on, for example, a photographed image of the mobile bodies 10 photographed by a camera 21. The motion detection device 2 outputs the detected pieces of motion information on the mobile bodies 10 to the command device 3.

Incidentally, the motion detection device 2 acquires the pieces of motion information on the respective mobile bodies 10 through the use of a distance sensor such as the camera 21 or the like, but the invention is not limited thereto. For example, the mobile bodies 10 may be mounted with global positioning system (GPS) devices' respectively, and the motion detection device 2 may detect the pieces of motion information on the respective mobile bodies 10, based on UPS information transmitted from the UPS devices of the respective mobile bodies 10.

The command device 3 is a concrete example of the command unit, and issues motion commands (traveling forward or backward, turning right or left, accelerating or decelerating, stopping or the like) to the users that operate the mobile bodies 10. The command device 3 is constituted by, for example, a display device, a speaker or the like. The command device 3 issues a motion command to the users of the mobile bodies 10, based on pieces of motion information on the mobile bodies 10, pieces of motion information being output from the motion detection device 2. The command device 3 displays the positions to which the mobile bodies 10 should move, the moving directions of the mobile bodies 10, the moving speeds of the mobile bodies 10, the moving accelerations of the mobile bodies 10 and the like, for example, on a display screen of a display device 31, as motion commands. Besides, the command device 3 issues, to the users, commands such as the positions to which the mobile bodies 10 should move, the moving directions (traveling forward or backward, turning right or left) of the mobile bodies 10, the moving speeds (accelerating or decelerating) of the mobile bodies 10, and the like, based on the positions, moving directions, moving speeds and the like of the mobile bodies 10 that are output from the motion detection device 2.

The display device 31 displays the motion commands issued to the aforementioned users, on the display screen, and is constituted by, for example, a liquid-crystal display device, an organic EL device or the like. The display screen of the display device 31 may function as a touch panel. The users can input any pieces of information such as training information, operation information, user information and the like by touching the display screen of the display device 31. A speaker 32 acoustically issues motion commands to the aforementioned users.

Figure 3:
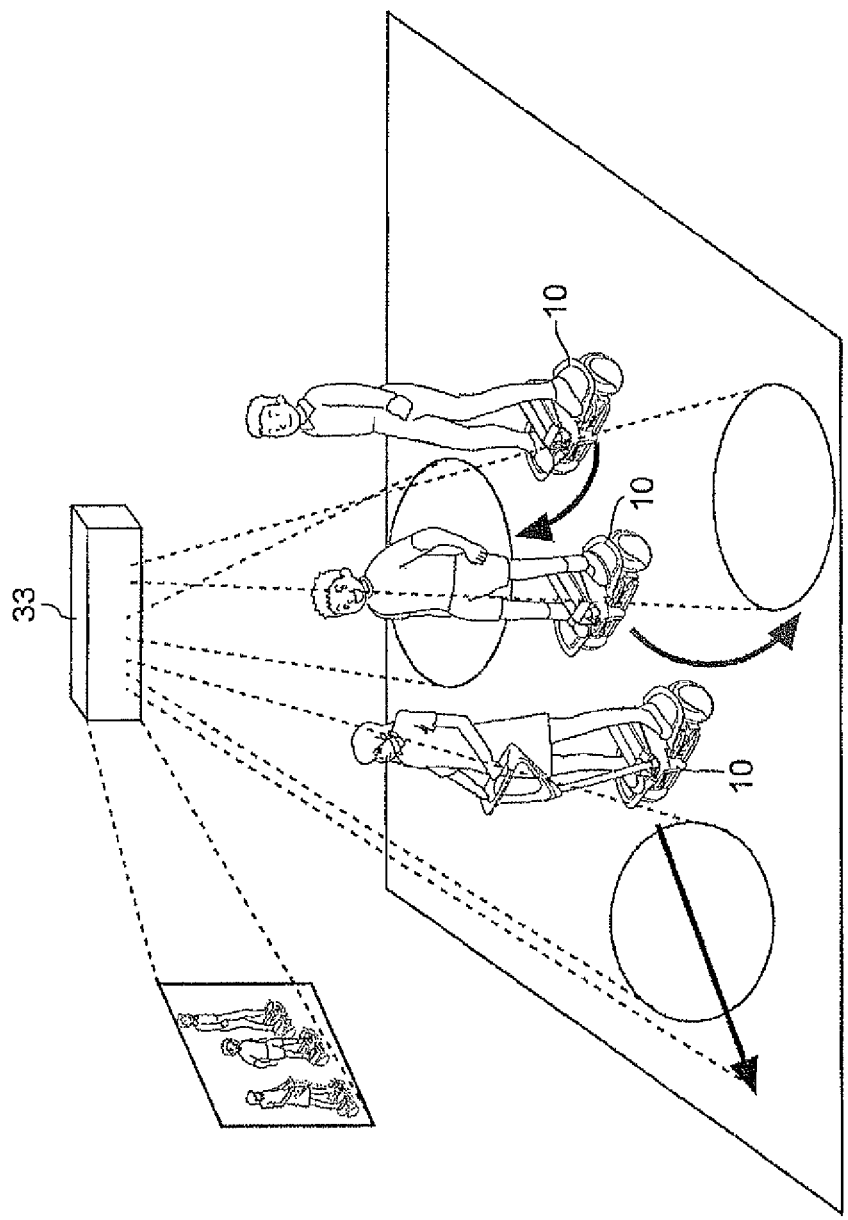
FIG. 3 is a view showing one example of configuration in which a motion command is issued through the use of a projection device.

The command device 3 may issue motion commands through the use of a projection device (a projector) 33. For example, using the projection device 33, the command device 3 projects motion commands such as the positions to which the mobile bodies 10 should move, the moving directions of the mobile bodies 10, the moving speeds of the mobile bodies 10 and the like onto a road surface, a wall surface or the like (FIG. 3).

The warning device 4 is a concrete example of the warning unit, and is constituted by a display device, a speaker or the like. The warning device 4 uses the display device 31 to display a warning indication on the display screen thereof, or uses the speaker 32 to acoustically output a warning sound. Furthermore, the warning device 4 may display a warning on the road surface or the wall surface through the use of the projection device 33.

Figure 4:
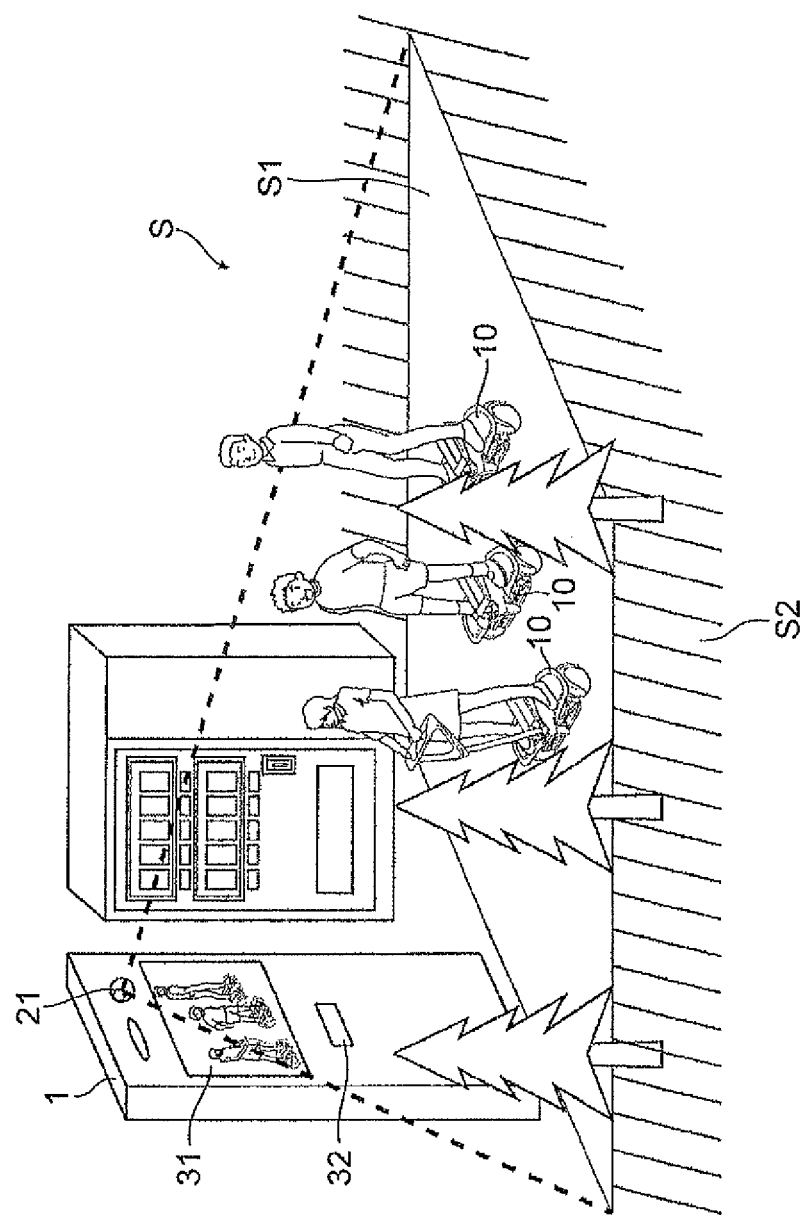
FIG. 4 is a view showing an accessible region and an inaccessible region that are set within a predetermined region.

By the way, as described above, the training of the mobile bodies 10 is carried out within a predetermined region S (FIG. 4). An accessible region S1 that can be entered by the mobile bodies 10 and an inaccessible region (a hatched portion) S2 that cannot be entered by the mobile bodies 10 are set in this predetermined region S. This accessible region S1 is a region that is safe in terms of the entrance and traveling of the mobile bodies 10. On the other hand, the inaccessible region S2 is a region that prohibits the entrance of the mobile bodies 10 due to a possibility of contact between the mobile bodies 10 and an obstacle or the like.

The training system 1 according to the present embodiment of the invention is characterized by warning the users when the distances between the mobile bodies 10 and the aforementioned inaccessible region S2 become equal to or shorter than a first predetermined value and the mobile bodies 10 approach the inaccessible region S2. The users can reliably avoid contact between the mobile bodies 10 and an obstacle or the like by operating the mobile bodies 10 in accordance with the warning and avoiding the entrance of the mobile bodies 10 into the inaccessible region S2.

The motion detection device 2 detects relative positions of the mobile bodies 10 within the predetermined region S and a relative position of the inaccessible region S2 within the predetermined region S, based on a photographed image of the predetermined region S photographed by the camera 21. Then, the motion detection device 2 detects distances between the mobile bodies 10 and the inaccessible region S2, based on the detected relative position of the mobile bodies 10 and the detected relative position of the inaccessible region S2 within the predetermined region S. The motion detection device 2 outputs the detected distances between the mobile bodies 10 and the inaccessible region S2 to the warning device 4. The warning device 4 warns the users through the use of the display device 31, the speaker 32, the projection device 33 and the like, when the distances between the mobile bodies 10 and the inaccessible region S2, the distances being output from the motion detection device 2, are equal to or shorter than the first predetermined value.

The warning device 4 notifies the users, for example, that the mobile bodies 10 approach the inaccessible region S2, through the use of the display device 31, the speaker 32, the projection device 33 and the like. Incidentally, the warning device 4 may issue motion commands to guide the mobile bodies 10 away from the inaccessible region S2, through the use of the display device 31, the speaker 32, the projection device 33 and the like.

By the same token, in the case where there are a plurality of mobile bodies 10 within the predetermined region S, the motion detection device 2 detects distances among the respective mobile bodies 10 within the predetermined region S, based on a photographed image of the predetermined region S photographed by the camera 21. The motion detection device 2 outputs the detected distances among the respective mobile bodies 10 to the warning device 4. The warning device 4 warns the users through the use of the display device 31, the speaker 32, the projection device 33 and the like, when the distances among the respective mobile bodies 10, the distances being output from the motion detection device 2, are equal to or shorter than a first predetermined value.

The warning device 4 notifies the users, for example, that the mobile bodies 10 approach one another, through the use of the display device 31, the speaker 32, the projection device 33 and the like. More specifically, the warning device 4 specifies only those mobile bodies 10 which are spaced apart from one another by a distance equal to or shorter than the first predetermined value, mobile bodies 10 approaching one another, and issues a warning (e.g., emphatically displays those mobile bodies 10 which approach one another, on the display device 31). Incidentally, the warning device 4 may issue motion commands to guide those mobile bodies 10 which have approached one another away from one another, through the use of the display device 31, the speaker 32, the projection device 33 and the like.

Figure 5:
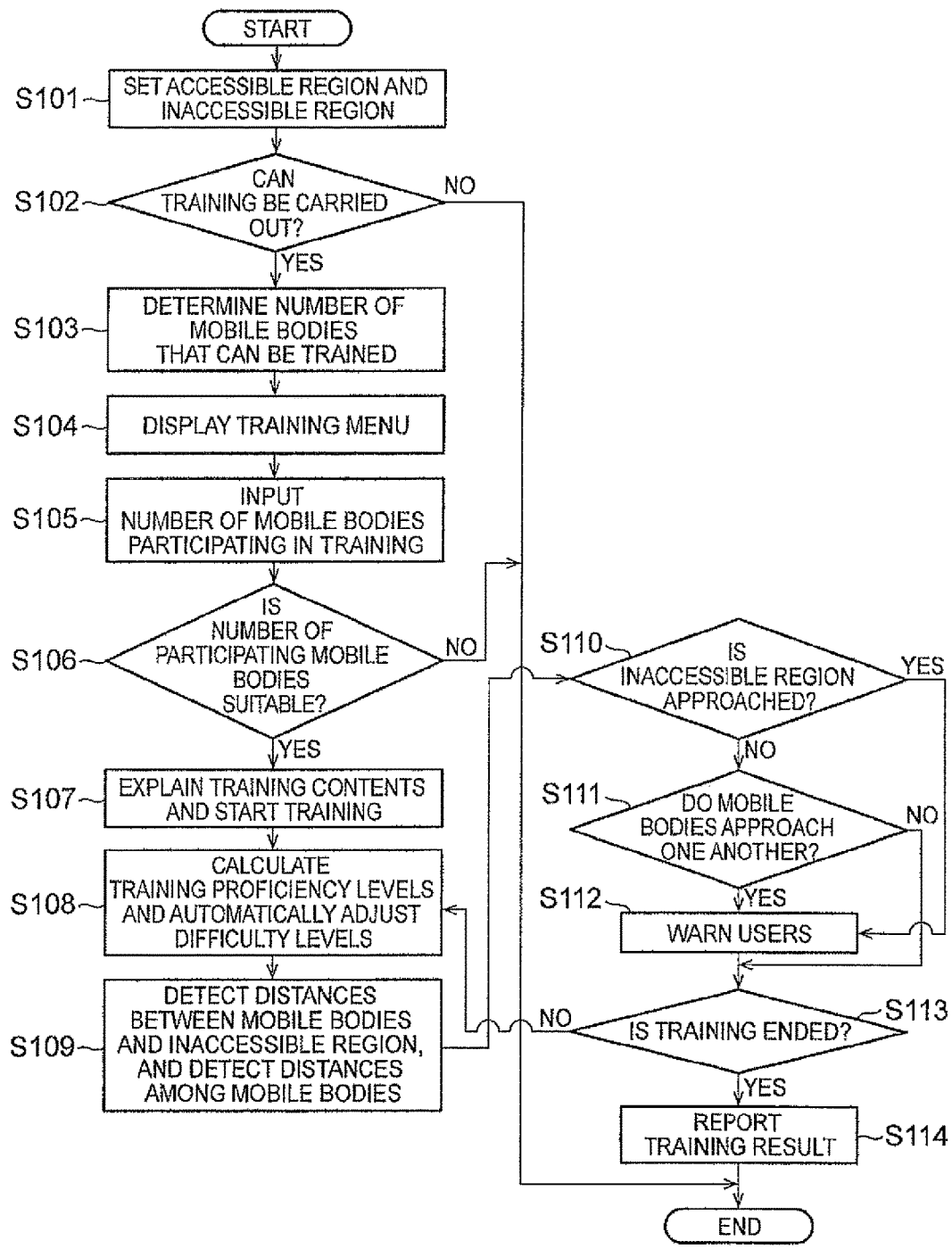
FIG. 5 is a flowchart showing a processing flow of a training method that is carried out by the training system according to the embodiment of the invention.

FIG. 5 is a flowchart showing a processing flow of a training method that is carried out by the training system according to the present embodiment of the invention.

The motion detection device 2 sets the accessible region S1 and the inaccessible region S2 in the predetermined region S, based on a photographed image of the predetermined region S photographed by the camera 21 (step S101). A training is carried out in the predetermined region S. Incidentally, the accessible region S1 and the inaccessible region S2 may be set in advance in the predetermined region S. The motion detection device 2 determines, based on areas of the set accessible region S1 and the set inaccessible region S2, whether or not the training can be carried out in the predetermined region S (step S102).

If it is determined that the training can be carried out in the predetermined region S (YES in step S102), the motion detection device 2 determines the number of the mobile bodies 10 that can be trained within the accessible region S2, based on the area of the accessible region S2 (step S103).

Subsequently, the command device 3 displays a training menu on the display screen of the display device 31 (step S104). The user can select the training to be carried out, for example, by touching the training menu (training contents, training difficulty levels and the like) displayed on the display device 31.

Incidentally, the command device 3 may recognize gestures (motions) of the users based on a photographed image of the users photographed by the camera 21, and may select the training to be carried out based on the motions. For example, the command device 3 may ask the users a question about the training through the use of the speaker 32, and may select the training to be carried out, based on motion images of the users in response to the question. Furthermore, the command device 3 may select a training menu based on acoustic commands of the users detected by a microphone 34. Thus, the users can select the training menu while remaining aboard the mobile bodies 10.

The number of the mobile bodies 10 participating in the training is input to the command device 3 via the display device 31 or the like (step S105). Incidentally, the command device 3 may automatically recognize the number of the mobile bodies 10 participating in the training, by recognizing the number of the mobile bodies 10 occupied by users, among the mobile bodies 10 that exist within the accessible region S2, based on the photographed image of the predetermined area S2 photographed by the camera 21. At this time, the display device 31 may display, in a marked manner, the accessible region S2 as a training location and the mobile bodies 10 participating in the training, on the photographed image photographed by the camera 21.

The command device 3 determines whether or not the input number of the mobile bodies 10 participating in the training is equal to or smaller than (suitable) the aforementioned determined number of the mobile bodies 10 that can be trained (step S106).

If it is determined that the number of the mobile bodies 10 participating in the training is equal to or smaller than the number of the mobile bodies 10 that can be trained and that the training can be carried out (YES in step S106), the command device 3 explains the contents of the training that is selected and carried out through the use of the display device 31 and the speaker 32. After that, the command device 3 starts the training by issuing motion commands to the users through the use of the display device 31 and the speaker 32 (step S107). The command device 3 issues motion commands, for example, such that main bodies of the mobile bodies are inclined away from the inaccessible region S2. Thus, the mobile bodies 10 naturally travel apart from the inaccessible region S2 during the training, so the level of safety is further enhanced.

If it is determined that the number of the mobile bodies 10 participating in the training is larger than the number of the mobile bodies 10 that can be trained and that the training cannot be carried out (NO in step S106), the command device 3 ends the present process. Incidentally, the command device 3 may command the users to reduce the number of the mobile bodies 10 participating in the training, through the use of the display device 31 and the speaker 32.

The command device 3 calculates training proficiency levels of the users aboard the respective mobile bodies 10, based on a photographed image of the respective mobile bodies 10 photographed by the camera 21. Then, the command device 3 automatically adjusts, for example, the training difficulty levels of the training menu, in accordance with the calculated training proficiency levels of the users of the respective mobile bodies 10 (step S108).

The command device 3 calculates the training proficiency levels of the users, for example, by evaluating traveling operations of the mobile bodies 10 in response to riding postures of the users and motion commands during the training, based on the photographed image of the respective mobile bodies 10 photographed by the camera 21. In the case where the users assume a bad riding posture (inclined too forward, bent back or the like) during the training, the evaluations are low, so the training proficiency levels are low. Besides, in the case where the moving speeds of the mobile bodies 10 are unstable or where the traveling operations of the users do not follow the motion commands of the command device 3, the evaluations are low, so the training proficiency levels are low.

The motion detection device 2 detects distances between the respective mobile bodies 10 and the inaccessible region S2 and distances among the respective mobile bodies 10, based on a photographed image of a predetermined region photographed by the camera 21 (step S109).

The warning device 4 determines whether or not the distances between the respective mobile bodies 10 and the inaccessible region S2 are equal to or shorter than a first predetermined value (the mobile bodies 10 approach the inaccessible region S2) (step S110). If it is determined that the distances between the respective mobile bodies 10 and the inaccessible region S2 are equal to or shorter than the first predetermined value (YES in step S110), the warning device 4 makes a transition to the following (step S112). On the other hand, if it is determined that the distances between the respective mobile bodies 10 and the inaccessible region S2 are not equal to or shorter than the first predetermined value (NO in step S110), the warning device 4 determines whether or not the distances among the respective mobile bodies 10 are equal to or shorter than a second predetermined value (the mobile bodies 10 approach one another) (step S111).

If it is determined that the distances among the respective mobile bodies 10 are equal to or shorter than the second predetermined value (YES in step S111), the warning device 4 issues a warning through the use of the display device 31 and the speaker 32 (step S112).

The command device 3 determines, based on a time from the start of the training or commands from the users and the like, whether or not the training should be ended (step S113). If it is determined that the training should be ended (YES in step S113), the command device 3 fixes the training proficiency levels calculated for the respective mobile bodies 10, and reports a result of the training to the users of the respective mobile bodies 10 (step S114). For example, the command device 3 causes the display device 31 to display the training proficiency level, an optimal training menu corresponding to the training proficiency level, and the like for each of the users of the respective mobile bodies 10.

As described above, in the training system 1 according to the present embodiment of the invention, when the distances between the mobile bodies 10 and the aforementioned inaccessible region S2 become equal to or shorter than the first predetermined value and the mobile bodies 10 approach the inaccessible region S2, the users are warned. The users can definitely avoid contact with an obstacle or the like by operating the mobile bodies 10 in accordance with the warning to avoid the entrance of the mobile bodies 10 into the inaccessible region S2. Thus, the level of safety can be enhanced. Incidentally, no assistant who provides assistance in the training or the like is required, so the labor-saving of the training can be achieved. That is, high levels of safety and labor-saving can be realized.

Incidentally, the invention is not limited to the aforementioned embodiment thereof, and can be appropriately modified without departing from the gist thereof.

In the aforementioned embodiment of the invention, the warning device 4 issues a warning when the distances between the mobile bodies 10 and the inaccessible region S2, the distances being output from the motion detection device 2, are equal to or shorter than the first predetermined value, or when the distances among the mobile bodies are equal to or shorter than the second predetermined value, but the invention is not limited thereto. The warning device 4 may issue the aforementioned warning, and may issue an exit command to the mobile bodies 10, the exit command causing the users aboard the mobile bodies 10 to get off. The respective mobile bodies 10 perform exit control for causing the users to get off (e.g., deceleration control, control for bringing auxiliary wheels into contact with the ground, or the like), in accordance with the exit command from the warning device 4. For example, upon the start of the performance of exit control, the respective mobile bodies 10 perform the control of reducing the moving speeds and gradually restraining turns from being made. Subsequently, the mobile bodies 10 control, in a time-series manner, the target posture angle (the angle of inclination) in a pitch direction toward the backward side. Thus, the mobile bodies 10 are inclined backward and decelerated. Then, when it is determined that the target posture angle is achieved (or that both the legs of the users have gotten off from step portions, based on a signal from a step sensor), the mobile bodies 10 stop exit control. Thus, it is possible to reliably prevent the mobile bodies from traveling within the inaccessible region, and reliably prevent the mobile bodies from approaching one another, so the level of safety can be further enhanced.

In the aforementioned embodiment of the invention, the training system 1 trains the inverted two-wheel vehicles, but the invention is not limited thereto. For example, the training system 1 may train motor vehicles, and can train any mobile bodies that can be operated by the users for traveling. Besides, in the training system 1, the users are aboard the mobile bodies 10 to be trained in the traveling operation thereof, but the invention is not limited thereto. The users may remotely operate the mobile bodies 10 to be trained in the operation thereof. In the aforementioned embodiment of the invention, the training system 1 provides a training in the traveling of the mobile bodies 10, but the invention is not limited thereto. The training system 1 may be applied to a game that is operated by the mobile bodies 10.

What is claimed is:

1. A training system in which an inverted two-wheel vehicle is operated by a user in accordance with a motion command issued from a command unit by the user, the training system comprising:

a first detection unit that is configured to detect a motion of the inverted two-wheel vehicle when moving within a predetermined region, the predetermined region including an accessible region that can be entered by the inverted two-wheel vehicle and an inaccessible region that cannot be entered by the inverted two-wheel vehicle;

the command unit that is configured to issue a motion command for the inverted two-wheel vehicle based on the motion of the inverted two-wheel vehicle detected by the first detection unit;

a second detection unit that is configured to detect a distance between the inverted two-wheel vehicle and the inaccessible region; and a warning unit that is configured to:
when the distance between the inverted two-wheel vehicle and the inaccessible region detected by the second detection unit is equal to or shorter than a first predetermined value:
issue a warning, and
issue, to the inverted two-wheel vehicle, an exit command for causing the user of the inverted two-wheel vehicle to get off of the inverted two-wheel vehicle, wherein the inverted two-wheel vehicle:

upon receipt of the issued exit command: starts an exit control process including control that includes at least one of: (i) reducing a moving speed of the inverted two-wheel vehicle, and (ii) restraining turns from being made by the inverted two-wheel vehicle, and after performing control of the at least one of reducing of the moving speed and the restraining of turns from being made:

subsequently controls, in a time-series manner, a target posture angle in a pitch direction toward the backward side of the inverted two-wheel vehicle, thereby the inverted two-wheel vehicle is inclined backward, and when it is determined that the target posture angle has been achieved, stops the exit control process.

2. The training system according to claim 1, wherein
the inverted two-wheel vehicle is a first inverted two-wheel vehicle,
the training system further comprises: a third detection unit that is configured to detect a distance between the first inverted two-wheel vehicle and a second inverted two-wheel vehicle, the first and second inverted two-wheel vehicles moving within the predetermined region,
the warning unit issues another warning when the detected distance between the first inverted two-wheel vehicle and the second inverted two-wheel vehicle detected by the third detection unit is equal to or shorter than a second predetermined value.

3. The training system according to claim 1, wherein the warning unit issues a motion command to guide the inverted two-wheel vehicle away from the inaccessible region when the distance detected by the second detection unit is equal to or shorter than the first predetermined value.

4. The training system according to claim 1, wherein the inverted two-wheel vehicle performs inversion control in such a manner that the inverted two-wheel vehicle moves in accordance with an incline of a main body of the inverted two-wheel vehicle while maintaining an inverted state of the main body of the vehicle, and the command unit issues the motion command such that the main body of the inverted two-wheel vehicle is inclined away from the inaccessible region.

5. The training system according to claim 1, wherein the command unit:

calculates a training proficiency level of the user aboard the inverted two-wheel vehicle, based on the motion of the inverted two-wheel vehicle detected by the first detection unit, and adjusts a training difficulty level of a training menu in accordance with the calculated training proficiency level.

6. The training system according to claim 1, wherein the training system is adjacent to the predetermined region in which training of the inverted two-wheel vehicle is carried out.

7. A training method in which an inverted two-wheel vehicle is operated by a user in accordance with a motion command issued from a command unit by the user, the training method comprising:

detecting a motion of the inverted two-wheel vehicle moving within a predetermined region, the predetermined region including an accessible region that can be entered by the inverted two-wheel vehicle and an inaccessible region that cannot be entered by the vehicle;

detecting a distance between the inverted two-wheel vehicle and the inaccessible region; and when the detected distance between the inverted two-wheel vehicle and the inaccessible region is equal to or shorter than a first predetermined value:

issuing a warning, and issuing, to the inverted two-wheel vehicle, an exit command for causing the user of the inverted two-wheel vehicle to get off of the inverted two-wheel vehicle, wherein the inverted two-wheel vehicle:

upon receipt of the issued exit command: starts an exit control process including control that includes at least one of: (i) reducing a moving speed of the inverted two-wheel vehicle, and (ii) restraining turns from being made by the inverted two-wheel vehicle, and after performing control of the at least one of reducing of the moving speed and the restraining of turns from being made:

subsequently controls, in a time-series manner, a target posture angle in a pitch direction toward the backward side of the vehicle, thereby the inverted two-wheel vehicle is inclined backward, and when it is determined that the target posture angle has been achieved, stops the exit control process.

8. The training method according to claim 7, wherein the training method is for use by a training system that is adjacent to the predetermined region in which training of the inverted two-wheel vehicle is carried out.

* * * * *